(12) United States Patent  
Johnston et al.

(10) Patent No.: US 10,209,476 B2  
(45) Date of Patent: Feb. 19, 2019

(54) HARD SURFACE DEPLOYED FIBER

(71) Applicant: Google Inc., Mountain View, CA (US)

(72) Inventors: Chad Johnston, Mountain View, CA (US); Enrique Gonzalez Lopez, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/432,049

(22) Filed: Feb. 14, 2017

(65) Prior Publication Data

US 2018/0231733 A1     Aug. 16, 2018

(51) Int. Cl.

| | |
|---|---|
| *E01F 11/00* | (2006.01) |
| *G02B 6/44* | (2006.01) |
| *G02B 6/46* | (2006.01) |
| *G02B 6/50* | (2006.01) |
| *E01C 11/00* | (2006.01) |
| *E01C 23/00* | (2006.01) |
| *H04B 10/27* | (2013.01) |

(52) U.S. Cl.  
CPC .............. *G02B 6/504* (2013.01); *E01C 11/00* (2013.01); *E01C 23/00* (2013.01); *E01F 11/00* (2013.01); *G02B 6/443* (2013.01); *G02B 6/4486* (2013.01); *G02B 6/46* (2013.01); *G02B 6/50* (2013.01); *H04B 10/27* (2013.01)

(58) Field of Classification Search  
CPC ........... G02B 6/443; G02B 6/46; E01F 11/00; B65H 49/205  
See application file for complete search history.

(56) References Cited

U.S. PATENT DOCUMENTS

| | | | |
|---|---|---|---|
| 9,531,174 B2* | 12/2016 | Elford | E01C 23/025 |
| 9,588,315 B1* | 3/2017 | Turner | G02B 6/443 |
| 9,904,029 B1* | 2/2018 | Hendrickson | G02B 6/46 |
| 2011/0292763 A1* | 12/2011 | Coates | E21B 47/01 |
| | | | 367/25 |
| 2016/0109036 A1* | 4/2016 | Elford | F16L 1/028 |
| | | | 405/184.1 |
| 2016/0356975 A1 | 12/2016 | Lish et al. | |

FOREIGN PATENT DOCUMENTS

| | | | | |
|---|---|---|---|---|
| GB | 2327680 A | * | 2/1999 | ............ E01C 11/103 |
| JP | 9224313 | | 8/1997 | |

\* cited by examiner

*Primary Examiner* — Ryan Lepisto  
*Assistant Examiner* — Erin Chiem  
(74) *Attorney, Agent, or Firm* — Honigman LLP

(57) ABSTRACT

A surface-mounted fiber segment includes at least one bare optical fiber glass segment disposed onto a receiving surface, and an adhesive material applied to the at least one bare optical fiber glass segment. The adhesive material substantially encapsulates the at least one bare optical fiber glass segment and adheres the at least one bare optical fiber glass segment onto the receiving surface.

18 Claims, 11 Drawing Sheets

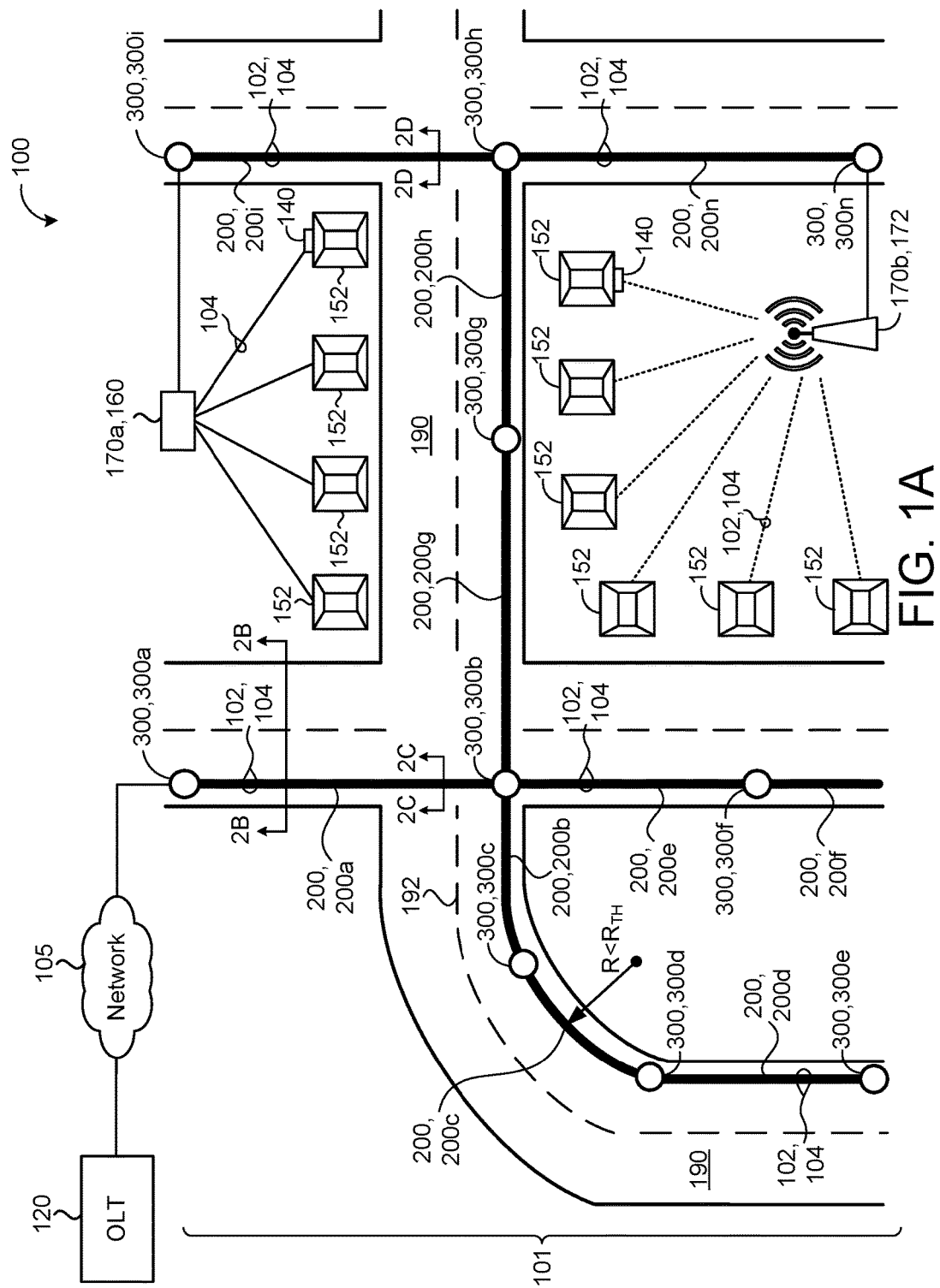

HARD SURFACE DEPLOYED FIBER

TECHNICAL FIELD

This disclosure relates to deploying fibers on hard surfaces.

BACKGROUND

Fiber optic communication is an emerging method of transmitting information from a source (transmitter) to a destination (receiver) using optical fibers as the communication channel. A passive optical network (PON) generally includes an optical line terminal located at a service provider central office (e.g., a hub), a remote node connected to the central office by a feeder fiber, and a number of optical network units or optical network terminals, near end users. The remote node demultiplexes an optical signal from the central office and distributes the demultiplexed optical signals to multiple optical network terminals along corresponding distribution fibers.

Various methods can be used to deploy optical fibers in fiber optic communication systems. Existing methods include stringing fiber cable aerially along existing utility poles and/or burying cables straight into the ground or in existing or new ducts.

SUMMARY

Deploying optical cables aerially or underground can be labor intensive and costly. Moreover, deploying fiber cables aerially may be impractical due to existing utility poles being full or the owners of the utility poles may not permit fiber to be strung on the poles. Furthermore, new aerial deployments may not be permitted due to zoning or other regulations. On the other hand, burying fiber cables underground may not be feasible in many scenarios either. Typically in urban areas, fiber cable needs to be buried under a roadway anywhere from one (1) foot up to five (5) feet under the surface. Heavy equipment is generally required to cut through the asphalt, concrete, or tarmac, and debris must be removed before deploying the fiber cable underground. In addition to high costs for restoring the road surface and time and effort to bury fiber cables underground, it is often difficult for service providers to maintain the underground fiber network, because excavation and restoration are often required to locate and repair a faulty segment of fiber cable. The present disclosure describes a surface deployment of optical fiber, inter alia, that overcomes the shortcomings of previous ways of installing optical fiber for optical networks.

One aspect of the disclosure provides a surface-mounted fiber segment that includes at least one bare optical fiber glass segment disposed onto a receiving surface (e.g., a road surface or other surface) and an adhesive material applied to the at least one bare optical fiber glass segment. The adhesive material substantially encapsulates the at least one bare optical fiber glass segment and adheres the at least one bare optical fiber glass segment onto the receiving surface.

Implementations of the disclosure may include one or more of the following optional features. In some implementations, the adhesive material and the at least one bare optical fiber glass segment adhered onto the receiving surface has a collective thickness of less than about 15 millimeters above the receiving service. In some examples, the collective thickness is less than 2-10 millimeters. A terminal end of the at least one bare optical fiber glass segment may be received by a junction box. The junction box may be deposited into a recess formed into the receiving surface.

In some examples, the at least one bare optical fiber glass segment includes a plurality of bare optical fiber glass segments that extend substantially parallel to one another along the receiving surface. The surface-mounted fiber segment may optionally include a pre-coating material applied to the receiving surface such that the pre-coating material is disposed between the at least one bare optical fiber glass segment and the receiving surface.

The adhesive material may form a protective covering around the at least one bare optical fiber glass segment, and may be further configured to compensate for distortions of the receiving surface. In some implementations, the at least one bare optical fiber glass segment is not be covered by a protective jacket. In additional implementations, the at least one bare optical fiber glass segment is neither covered by a protective sheath nor a protective jacket. In yet additional implementations, the at least one bare optical fiber glass segment includes a protective sheath to increase a thickness of a matrix used to bond multiple bare optical fiber glass segments into a multi-fiber ribbon.

Another aspect of the disclosure provides a surface-mounted fiber network that includes a plurality of surface-mounted fiber segments disposed onto a receiving surface, and a plurality of junction boxes deposited into corresponding recesses formed into the receiving surface. Each junction box interconnects at least two of the surface-mounted fiber segments to one another. Each surface-mounted fiber segment includes at least one bare optical fiber glass segment disposed onto a receiving surface, and an adhesive material applied to the at least one bare optical fiber glass segment. The adhesive material substantially encapsulates the at least one bare optical fiber glass segment and adheres the at least one bare optical fiber glass segment onto the receiving surface.

This aspect may include one or more of the following optional features. In some implementations, the adhesive material and the at least one bare optical fiber glass segment adhered onto the receiving surface has a collective thickness of less than about 15 millimeters above the receiving service. Additionally or alternatively, at least one of the junction boxes has a top surface arranged substantially flush with the receiving surface.

In some examples, one of the junction boxes is configured to interconnect a first surface-mounted fiber segment and a second surface-mounted fiber segment. The first surface-mounted fiber segment includes a first group of bare optical fiber glass segments that extend along the receiving surface in a first direction away from the junction box, and the second surface-mounted fiber segment includes a second group of bare optical fiber glass segments that extends along the receiving surface in a second direction away from the junction box. The first direction may be substantially parallel to the second direction, or the first direction and the second direction may be divergent.

In some implementations, the one of the junction boxes is further configured to interconnect a third surface-mounted fiber segment to the first surface-mounted fiber segment. In these implementations, the third surface-mounted fiber segment includes a third group of optical fiber glass segments that extend along the receiving surface away from the junction box such that each bare optical fiber glass segment of the third group of bare optical fiber glass segments is optically coupled to a corresponding bare optical fiber glass segment of the first group of bare optical fiber glass segments. Additionally, the third group of optical fiber glass segments may extend away from the junction box in a third direction divergent to at least one of the first direction or the third direction.

The surface-mounted fiber segment may optionally include a pre-coating material applied to the receiving surface such that the pre-coating material is disposed between the at least one bare optical fiber glass segment and the receiving surface. The adhesive material may form a protective covering around the at least one bare optical fiber glass segment, and may be further configured to compensate for distortions of the receiving surface. In some implementations, the at least one bare optical fiber glass segment is not be covered by at least one of a protective sheath or a protective jacket.

Another aspect of the disclosure provides a method of deploying a surface-mounted fiber network. The method includes unspooling at least one bare optical fiber glass segment from at least one corresponding spool, and depositing the unspooled at least one bare optical fiber glass segment onto the a receiving surface. While depositing the at least one bare optical fiber glass segment onto the receiving surface, the method also includes applying an adhesive material to the at least one bare optical fiber glass segment such that the adhesive material substantially surrounds and adheres the at least one bare optical fiber glass segment onto the receiving surface.

This aspect may include one or more of the following optional features. In some examples, the method further includes forming a recess in the receiving surface, depositing a junction box in the recess of the receiving surface, and terminating the at least one bare optical fiber glass segment in a junction receptacle defined by the junction box. Additionally, the method may also include optically coupling the at least one bare optical fiber glass segment terminated in the junction receptacle of the junction box to another bare optical fiber glass segment terminated in the junction receptacle of the junction box. Additionally, a top surface of the junction box may be arranged substantially flush with the receiving surface.

In some implementations, the adhesive material and the at least one bare optical fiber glass segment adhered onto the receiving surface has a collective thickness of less about 15 millimeters above the receiving service. In some configurations, prior to depositing the unspooled at least one bare optical fiber glass segment onto the receiving surface, the method may optionally include applying a pre-coating material to the receiving surface such that the pre-coating material lies underneath the at least one bare optical fiber glass segment when the at least one bare optical fiber glass segment is deposited onto the receiving surface.

In some examples, the adhesive material forms a protective covering around the at least one bare optical fiber glass segment, and may be further configured to compensate for distortions of the receiving surface. In some implementations, the at least one bare optical fiber glass segment is not be covered by at least one of a protective sheath or a protective jacket. Additionally or alternatively, applying the adhesive material to the at least one bare optical fiber glass segment includes spraying the adhesive material as a liquid out of at least one nozzle. Here, the at least one nozzle is directed toward the at least one bare optical fiber glass segment.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is schematic view of a surface-mounted fiber network of an example communication system.

Like reference symbols in the various drawings indicate like elements.

DETAILED DESCRIPTION

Figure 1B:
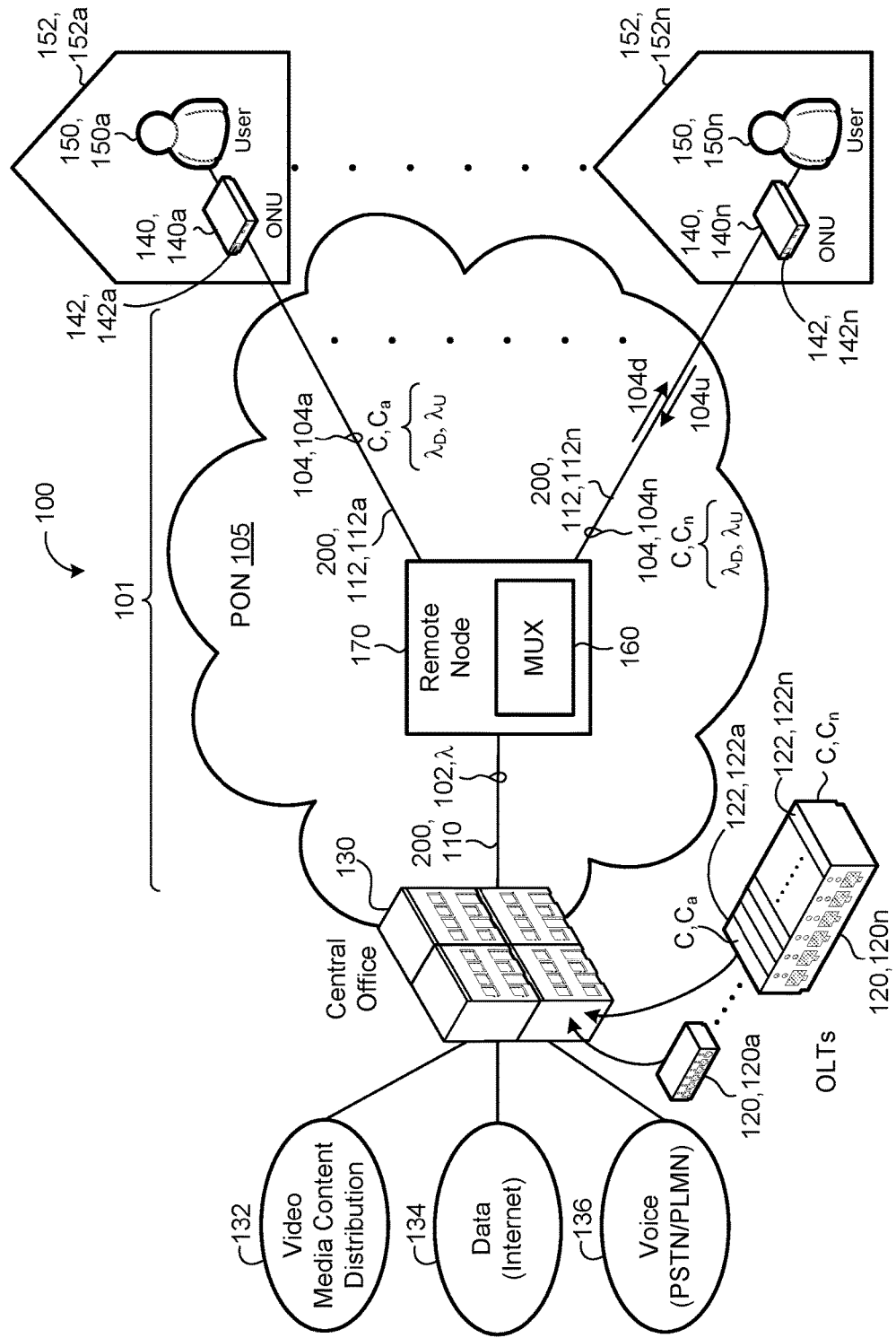
FIG. 1B is a schematic view of an example communication system including the surface-mounted fiber network of FIG. 1A.

Referring to FIGS. 1A and 1B, in some implementations, a communication system 100 uses a surface-mounted fiber network 101 to deploy optical fiber links 110, 110a-n, 112, 112a-n through an optical access network 105 between an optical line terminal (OLT) 120 and user premises 152 of end users 150 (also referred to as customers or subscribers). Referring to FIG. 1A, the surface-mounted fiber network 101 includes a plurality of surface-mounted fiber segments 200, 200a-n disposed onto a receiving surface 190 (e.g., a road surface) and a plurality of junction boxes 300, 300a-n interconnecting the surface-mounted fiber segments 200 to one another. The junction boxes 300, 300a-n receive and optically couple at least two surface-mounted fiber segments 200, 200a-n together, thereby permitting optical signals 102, 104 to route through various segments 200 of the surface-mounted fiber network 101 between the OLT 120 and the premises 152. The use of surface-mounted fiber segments 200 allows for the optical fiber links 110, 112 to be deployed at a much faster rate compared to traditional techniques that deploy fiber cables aerially or burying fiber cables underground. Additionally, deploying the surface-mounted fiber segments 200 onto the receiving surface 190 is not at risk of violating many of the zoning or other regulations impact the design and deployment of aerial and underground fiber networks.

The receiving surface 190 is exposed to the external environment and may be composed of a durable material laid down on an area intended to sustain vehicular traffic or foot traffic. The durable materials of the receiving surface 190 may include, without limitation, concrete, asphalt, tarmac, or composite pavements. In the examples shown, the receiving surface 190 includes a roadway surface or highway surface used by vehicles and has traffic lines 192 applied (e.g., painted) thereon for segmenting traffic lanes. In other examples, the receiving surface 190 may include a driveway, sidewalk, or walkway.

Figure 2A:
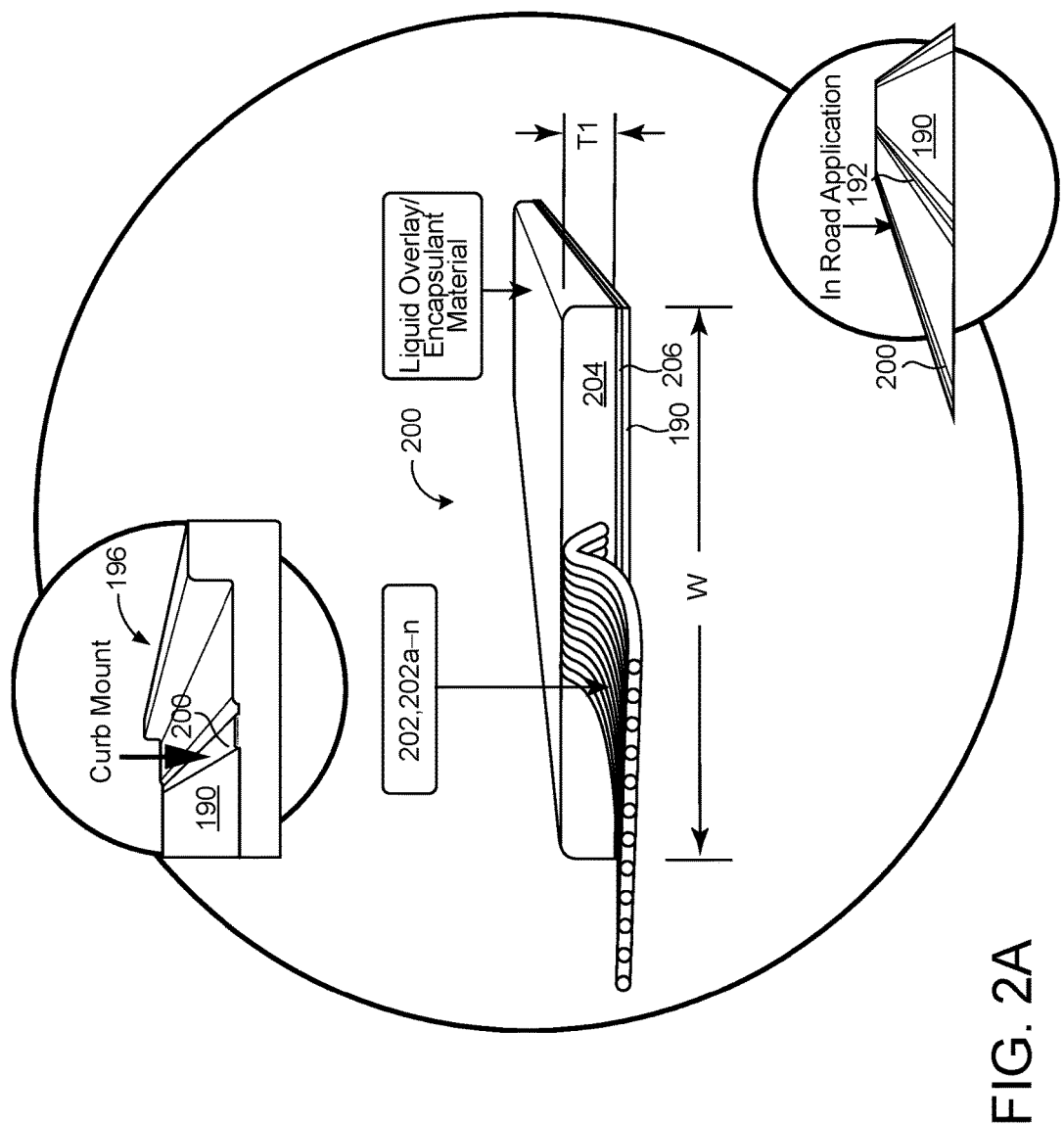
FIG. 2A is a schematic view of an example surface-mounted fiber segment including a plurality of bare optical fiber glass segments adhered onto a receiving surface by an adhesive material.

FIG. 2A shows a surface-mounted fiber segment 200 including a plurality of bare optical fiber glass segments 202, 202a-n disposed onto the receiving surface 190, and an adhesive material 204 applied to the bare optical fiber glass segments 202. Each bare optical fiber glass segment 202 may route a corresponding optical signal 102, 104 having the same or a different wavelength than one or more of the other bare optical fiber glass segments 202. The adhesive material 204 substantially encapsulates the bare optical fiber glass segments 202 and adheres the bare optical fiber glass segments 202 onto the receiving surface 190. While conventional fiber cables include jackets, cladding, and/or other protective sheaths, the bare optical fiber glass segments 202 are not covered by a protective jacket, and therefore only slightly protrude above the receiving surface 190. For instance, the bare optical fiber glass segments 202 may include a diameter of less than one (1) millimeter. In additional implementations, the bare optical fiber glass segments 202 are neither covered by a protective sheath nor a protective jacket. In yet additional implementations, the bare optical fiber glass segments 202 includes a protective sheath to increase a thickness of a matrix used to bond multiple bare optical fiber glass segments 202 into a multi-fiber ribbon. In the example shown, the plurality of bare optical fiber glass segments 202, 202a-n of the surface-mounted fiber segment 200 extend in parallel with one another along the receiving surface 190. In some examples, other surface-mounted fiber segments 200 in the surface-mounted fiber network 101 include only a single bare optical fiber glass segment 202.

The adhesive material 204 may be applied simultaneously as each bare optical fiber glass segment 202 is disposed onto the receiving surface 190 so that bare optical fiber glass segments 202 are substantially surrounded and encapsulated by the adhesive material. The adhesive material 204 may be applied in liquid form and may harden to adhere the bare optical fiber glass segments 202 to the receiving surface 190. The adhesive material 204 may be a bitumen-free, cold liquid-applied, fast-curing, high-modulus, and thermosetting resin. For example, the adhesive material 204 may comprise Methyl Methacrylate (MMA). In some examples, the adhesive material 204 is applied when the receiving surface 190 is dry and within a temperature range from zero-degrees Celsius (0° C.) to about fifty-degrees Celsius (50° C.). Additionally, the adhesive material 204 may also forms a protective covering around the bare optical fiber glass segments 202 upon hardening and may compensate for distortions of the receiving surface 190. For instance, distortions may include abrasion, pot holes, or surface cracks of the receiving surface 190 that may be filled by the adhesive material 204. Thus, while each bare optical fiber glass segment 202 is unprotected (e.g., not covered by a protective jacket) when initially disposed upon the receiving surface 190, the adhesive material 204 form the protective covering around the bare optical fiber glass segments 202 to provide protection as well as the adhering properties for adhering the bare optical fiber glass segments 202 onto the receiving surface 190. By eliminating the need for protective jackets, the adhesive material 204 and the bare optical fiber glass segments 202 adhered onto the receiving surface 190 includes a collective thickness $T_1$ of less than about 15 millimeters above the receiving surface 190. In some examples, the collective thickness $T_1$ is within a range of half (0.5) a millimeter to two (2) millimeters. By contrast, covering the bare optical fiber glass segments 202 with a cladding and buffer coating to provide a cable having a protective sheath or jacket, results in a collective thickness exceeding five (5) millimeters. Thicknesses exceeding about 15 millimeters may be unacceptable, as they may protrude too high from the receiving surface 190 and may interfere with vehicles and/or pedestrians travelling on the receiving surface. The surface-mounted fiber segment 200 may define a width W of about four (4) inches.

Optionally, a pre-coating material 206 may be applied to the receiving surface 190 before disposing the bare optical fiber glass segments 202 onto the receiving surface 190 and applying the adhesive material 204. The pre-coating material 206 may provide additional protection between the bare optical fiber glass segments 202 and the receiving surface 190 and/or help facilitate in adhering the bare optical fiber glass segments 202 to the receiving surface 190 when the adhesive material 204 is applied. The pre-coating material 206 may include a liquid material applied to the receiving surface 190 or may include a combination of a mesh material and liquid material applied to the receiving surface 190. The receiving surface 190 may be cleared of debris prior to deploying the surface-mounted fiber segment 200 onto the receiving surface 190.

In some implementations, the adhesive material 204 has a color that is the same as a color of the receiving surface 190 so that the surface-mounted fiber segment 200 blends into the receiving surface 190. For instance, the adhesive material 204 may have a color associated with the color of pavement or asphalt. In other implementations, the adhesive material 204 has a color associated with a color of a traffic line. For instance, the adhesive material 204 may have a white color and the surface-mounted fiber segment 200 may be disposed along an edge of the roadway to define a shoulder line instead of having to paint the shoulder lines. In some examples, the surface-mounted fiber segment 200 is disposed onto the receiving surface 190 adjacent to a curb 196.

Referring to FIG. 1B, the communication system 100 delivers communication signals 102 (e.g., optical signals) through the optical fiber links 110, 110a-n, 112, 112a-n between the OLT 120 housed in a central office (CO) 130 and optical network units (ONUs) 140, 140a-n (e.g., a bidirectional optical transceiver) associated with the users 150, 150a-n. The ONUs 140, 140a-n are typically located at the premises 152, 152a-n of the users 150, 150a-n.

In some implementations, the optical communication system 100 implements the optical access network 105, such as a passive optical network (PON) 105, for example, for access and mobile fronthaul/backhaul networks. In some examples, the optical communication system 100 implements a point-to-point (pt-2-pt) PON having direct connections, such as optical Ethernets, where a home-run optical link 110, 112 (e.g., fiber) extends all the way back to an OLT 120 at the CO 130 and each customer 150, 150a-n is terminated by a separate OLT 120a-n. In other examples, the optical communication system 100 implements a point-to-multi-point (pt-2-multi-pt) PON, where a shared OLT 120 services multiple customers 150, 150a-n.

The CO 130 includes at least one OLT 120 connecting the optical access network 105 to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optical signals 102 used by the PON 105. Each OLT 120, 120a-n includes at least one transceiver 122, 122a-n, depending on the implementation of the optical access network 105. The OLT 120 sends the optical signal 102 via a corresponding transceiver 122, through a feeder fiber link 110 to a remote node (RN) 170, which demultiplexes the optical signal 102 and distributes the demultiplexed optical signals 102 to multiple users 150, 150a-n along corresponding distribution fiber links 112, 112a-n. The surface-mounted fiber segments 200 may be used to quickly deploy the feeder fiber link 110 and/or the distribution fiber links 112 without having to deploy the links 110, 112 aerially via existing utility poles or burying the links 110, 112 within trenches below ground.

The remote node 170 may include a multiplexer 160, which may be a passive optical device such as an arrayed wavelength grating (AWG), for multiplexing/demultiplexing optical signals 102 through the links 110, 112. In some examples, each CO 130 includes multiple OLTs 120, 120a-n, and each OLT 120 is configured to service a group of users 150. In addition, each OLT 120 may be configured to provide signals in different services, e.g., one OLT 120 may provide services in 1G-PON, while another OLT 120 provides services in 10G-PON.

As shown in FIG. 1, the CO 130 multiplexes signals received from several sources, such as a video media distribution source 132, an Internet data source 134, and a voice data source 136, and multiplexes the received signals into one multiplexed signal 102 before sending the multiplexed optical signal 102 to the RN 170 through the feeder fiber 110. The multiplexing may be performed by the OLT 120 or a broadband network gateway (BNG) positioned at the CO 130. Typically, services are time-division-multiplexed on the packet layer.

Time-division-multiplexing (TDM) is a method of transmitting and receiving independent signals over a common signal path by using different, non-overlapping time slots. Wavelength division multiplexing (WDM) uses multiple wavelengths λ to implement point-to-multi-point communications in the PON 105. The OLT 120 serves multiple wavelengths through one fiber 110 to the multiplexer 160 at the RN 170, which multiplexes/demultiplexes signals between the OLT 120 and a plurality of ONUs 140, 140a-n. Multiplexing combines several input signals and outputs a combined signal. Time wavelength division multiplexing (TWDM) uses both time and wavelength dimensions to multiplex signals.

For WDM, the OLT 120 includes multiple optical transceivers 122, 122a-n. Each optical transceiver 122 transmits signals at one fixed wavelength $\lambda_D$ (referred to as a downstream wavelength) and receives optical signals 102 at one fixed wavelength $\lambda_U$ (referred to as an upstream wavelength). The downstream and upstream wavelengths $\lambda_D$, $\lambda_U$ may be the same or different. Moreover, a channel C may define a pair of downstream and upstream wavelengths $\lambda_D$, $\lambda_U$, and each optical transceiver 122, 122-n of a corresponding OLT 120 may be assigned a unique channel $C_{a-n}$.

With continued reference to FIG. 1B, the OLT 120 multiplexes/demultiplexes the channels C, $C_{a-n}$ of its optical transceivers 122, 122a-n for communication of an optical signal 102 through the feeder fiber link 110. Whereas, the multiplexer 160 at the RN 170 multiplexes/demultiplexes optical signals 102, 104, 104-n between the OLT 120 and a plurality of ONUs 140, 140a-n. For example, for downstream communications, the multiplexer 160 demultiplexes the optical signal 102 from the OLT 120 into ONU optical signals 104, 104-n, i.e., downstream optical signals 104d, for each corresponding ONU 140, 140a-n. For upstream communications, the multiplexer 160 multiplexes ONU optical signals 104, 104-n from each corresponding ONU 140, 140a-n, i.e., upstream optical signals 104u, into the optical signal 102 for delivery to the OLT 120. To make the transmission successful, the optical transceivers 122, 122a-n of the OLT 120 match with the ONUs 140, 140-n one-by-one. In other words, the downstream and upstream wavelengths $\lambda_D$, $\lambda_U$ (i.e., the channel C) of respective downstream and upstream optical signals 104d, 104u to and from a given ONU 140 matches the downstream and upstream wavelengths $\lambda_D$, $\lambda_U$ (i.e., the channel C) of a corresponding optical transceiver 122. In some implementations, each ONU 140, 140a-n includes a corresponding tunable ONU transceiver 142, 142a-n (e.g., that includes a laser or light emitting diode) that can tune to any wavelength λ used by a corresponding OLT 120 at a receiving end. The ONU 140 may automatically tune the tunable ONU transceiver 142 to a wavelength λ that establishes a communication link between the corresponding OLT 120 and the ONU 140. The ONU 140 may include a photodetector that converts the optical wave to an electric form. The electrical signal may be further amplified and then de-multiplexed down to subcomponents (e.g., data over a network, sound waves converted into currents using microphones and back to its original physical form using speakers, converting images converted into currents using video cameras and converting back to its physical form using a television).

Referring back to FIG. 1A, the surface-mounted fiber segments 200, 200a-n may be disposed onto the receiving surface 190 (e.g., roadways) and the junction boxes 300, 300a-n optically coupling the surface-mounted fiber segments 200, 200a-n may be deposited into the receiving surface 190 such that a top surface 322 (FIGS. 3A and 3B) of each junction box is substantially flush with the receiving surface 190. A first surface-mounted fiber segment 200a extends in a first direction between a first end connected to a first junction box 300a and a second end connected to a second junction box 300b. Accordingly, a first surface-mounted fiber segment 200a may route optical signals 102, 104 between the first and second junction boxes 300a, 300b. In the example shown, the first junction box 300a serves as an ingress/egress point configured to optically couple the surface-mounted fiber network 101 to the OLT 120. The second junction box 300b interconnects and optically couples the first surface-mounted fiber segment 200a to additional surface-mounted fiber segments 200b, 200e, 200g each extending away from the second junction box 300b in different directions from one another. Specifically, the second junction box 300b is deposited into the receiving surface 190 at a location where two roadways intersect and the additional surface-mounted fiber segments 200b, 200g disposed onto the receiving surface 190 extend in opposite directions along the roadway that intersects the roadway at which the surface-mounted fiber segments 200a, 200c extend along.

The second surface-mounted fiber segment 200b extends in a second direction between a first end connected to the second junction box 300b and a second end connected to a third junction box 300c. The third junction box 300c interconnects and optically couples the second surface-mounted fiber segment 200b to a third surface-mounted fiber segment 200c that extends between a first end connected to the third junction box 300c and a second end connected to a fourth junction box 300d. The fourth junction box 300d interconnects and optically couples the third surface-mounted fiber segment 200c to a fourth surface-mounted fiber segment 200d that extends between a first end connected to the fourth junction box 300d and a second end connected to a fifth junction box 300e.

In some implementations, surface-mounted fiber segments 200 disposed along curved sections of the receiving surface 190 are shorter than segments disposed along relatively straight sections of the receiving surface 190. Generally, the at least one bare optical fiber glass segment 202, 202a-n of each surface-mounted fiber segment 200, 200a-b has a relatively high tensile strength, but is susceptible to breaking when bent beyond a threshold angle. Accordingly, sections of the receiving surface 190 that include a radius of curvature R that is less than a threshold radius of curvature $R_{TH}$ may require multiple shorter segments 200 interconnected by junction boxes 300 to prevent excessive bending (and preventing breakage) by any one bare optical fiber glass segment 202 disposed on the curved section of the receiving surface 190. In the example shown, the second, third, and fourth surface-mounted fiber segments 200b, 200c, 200d are each cut to a length sufficient to follow the radius of curvature R of the receiving surface 190. Moreover, the surface-mounted fiber segments 200 may extend along the receiving surface 190 in a direction parallel to vehicle traffic, perpendicular to vehicle traffic, and/or transverse to vehicle traffic.

As with the first surface-mounted fiber segment 200a, the fifth surface-mounted fiber segment 200e optically coupled to the first surface-mounted fiber segment 200a via the second junction box 300b also extends in the first direction. Here, the fifth surface-mounted fiber segment 200e extends between a first end connected to the second junction box 300b and a second end connected to a sixth junction box 300f. The sixth junction box 300f interconnects and optically couples the fifth surface-mounted fiber segment 200e to a sixth surface-mounted fiber segment 200f.

With continued reference to FIG. 1A, the seventh surface-mounted fiber segment 200g extends in a third direction between a first end connected to the second junction box 300b and a second end connected to a seventh junction box 300g. The seventh junction box 300g interconnects and optically couples the seventh surface-mounted fiber segment 200g to an eighth surface-mounted fiber segment 200h that extends between a first end connected to the seventh junction box 300g and a second end connected to an eighth junction box 300h. As with the second junction box 300b, the eighth junction box 300h is deposited into the receiving surface 190 at a location where two roadways intersect.

In the example shown, the eighth junction box 300h interconnects and optically couples the eighth surface-mounted fiber segment 200h to ninth and tenth surface-mounted fiber segments 200i, 200n each extending away from the eighth junction box 300h in different directions from one another. Specifically, the ninth and tenth surface-mounted fiber segments 200i, 200n disposed onto the receiving surface 190 extend in opposite directions along the roadway that intersects the roadway at which the surface-mounted fiber segments 200b, 200c, 200d, 200g, 200h extend along. The ninth and tenth surface-mounted fiber segments 200i, 200n may service different sets of premises 152 associated with different users 150.

The ninth surface-mounted fiber segment 200i extends between a first end connected to the eighth junction box 300h and a second end connected to a ninth junction box 300i. The ninth junction box 300i is optically coupled to a first remote node 170a servicing a set of premises 152 over a "last mile" (e.g., curb-to-home) or last-run link. In some examples, the first remote node 170a includes the multiplexer 160 which demultiplexes a downstream optical signal 102 from the ninth surface-mounted fiber segment 200i into ONU optical signals 104 for each corresponding ONU 140 located at each premises 152. In other examples, the first remote node 170a includes an optical splitter for splitting an optical signal 102, 104 received from the ninth surface-mounted fiber segment 200i into multiple split optical signals 104 for each corresponding ONU 140. The first remote node 170a may also include an optical switch for directing optical signals 102, 104 received from the ninth surface-mounted fiber segment 200i to different ONUs 140. Plastic or glass optical fibers may be used to route optical signals 104 over the "last mile" between each corresponding ONU 140 located at each premises 152 and the first remote node 170a.

The tenth surface-mounted fiber segment 200n extends between a first end connected to the eighth junction box 300h and a second end connected to a tenth junction box 300n. The tenth junction box 300n is optically coupled to a second remote node 170b servicing another group of premises 152 over a "last mile" (e.g., curb-to-home) or last-run link. In the example shown, the second remote node 170b includes a free space optical (FSO) terminal 172 for wirelessly transmitting optical signals 102, 104 to the premises 152. For instance, the FSO terminal 172 may receive the optical signal 102, 104 via the tenth surface-mounted fiber segment 200n and wirelessly beam the optical signal 102, 104 to each corresponding ONU 140 located at the premises 152. In some examples, the FSO terminal 172 uses multi-Gigabit connectivity to wirelessly transmit/receive optical signals 102, 104 to and from each corresponding ONU 140. Under these scenarios, each ONU 140 includes one or more antennas capable of operating in a receive mode for receiving the FSO beams containing the optical signals 102, 104 from the FSO terminal 172.

In some implementations, at least one of the remote nodes 170a, 170b includes an optical amplifier configured to amplify the optical signals 102, 104 before transmission to the corresponding ONUs 140. Additionally or alternatively, one or more junction boxes 300 may be optically coupled to a light source configured to pump light for amplifying optical signals 102, 104 routed between interconnected segments 200.

Figure 2B:
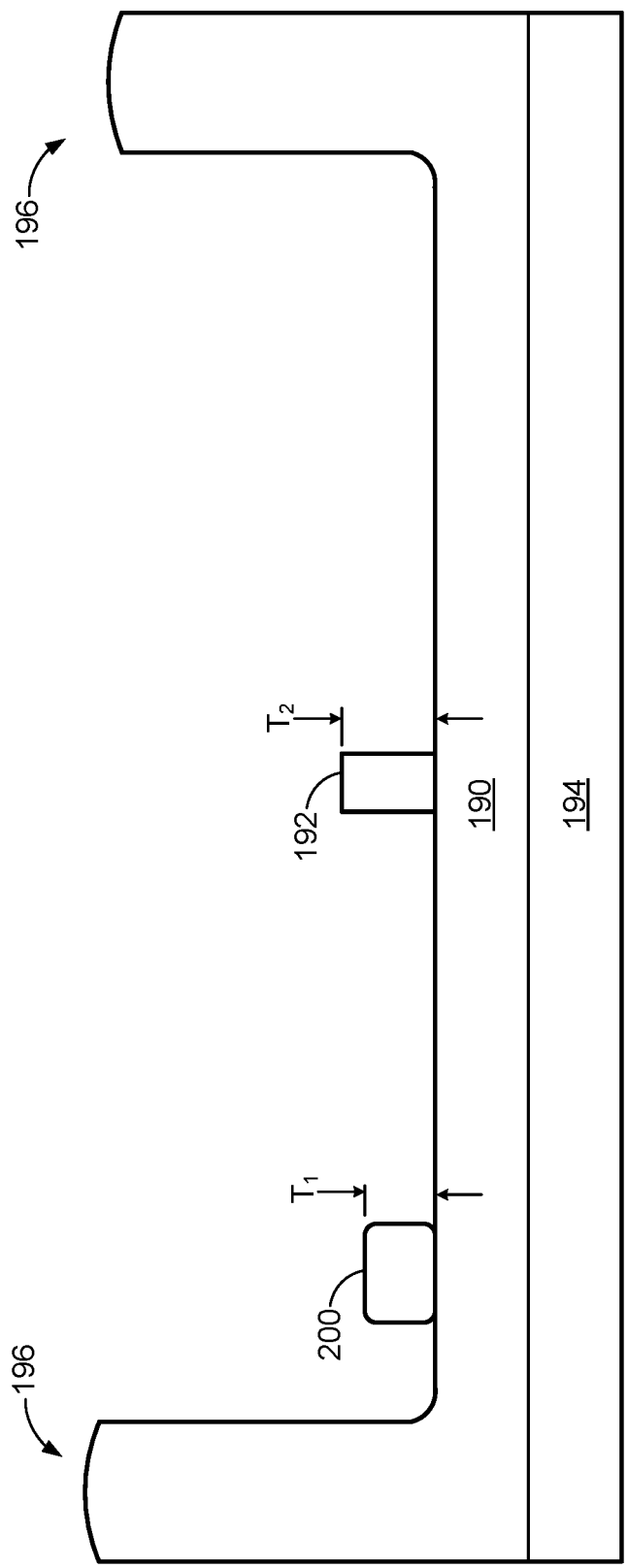
FIG. 2B is a cross-sectional view taken along line 2B-2B of FIG. 1A showing a first surface-mounted fiber segment disposed on a receiving surface and a traffic line painted on the receiving surface.

FIG. 2B provides a cross-sectional view taken along line 2B-2B of FIG. 1A showing the first surface-mounted fiber segment 200a disposed onto the receiving surface 190 and the traffic line 192 painted onto the receiving surface 190. In the example shown, the receiving surface 190 includes a roadway surface laid on a compacted base course 194. The roadway surface 190 may be composed of one or more durable materials such as, but not limited to, concrete, asphalt, tarmac, and/or composite pavements intended to sustain vehicular or foot traffic. In some examples, curbs 196 protrude from edges of the roadway surface 190. The curbs 196 may be composed of the same durable materials used to form the roadway surface 190. The surface-mounted fiber segment 200a formed by the adhesive material 204 and the bare optical fiber glass segments 202 adhered onto the receiving surface 190 may include a collective thickness $T_1$ that is less than or equal to a thickness $T_2$ associated with the painted traffic line 192. For instance, the thickness $T_1$ of the surface-mounted segment 200a may be less than about five (5) millimeters above the receiving surface 190, whereas the thickness $T_2$ of the traffic line 192 may be about five (5) millimeters above the receiving surface 190.

Figure 2C:
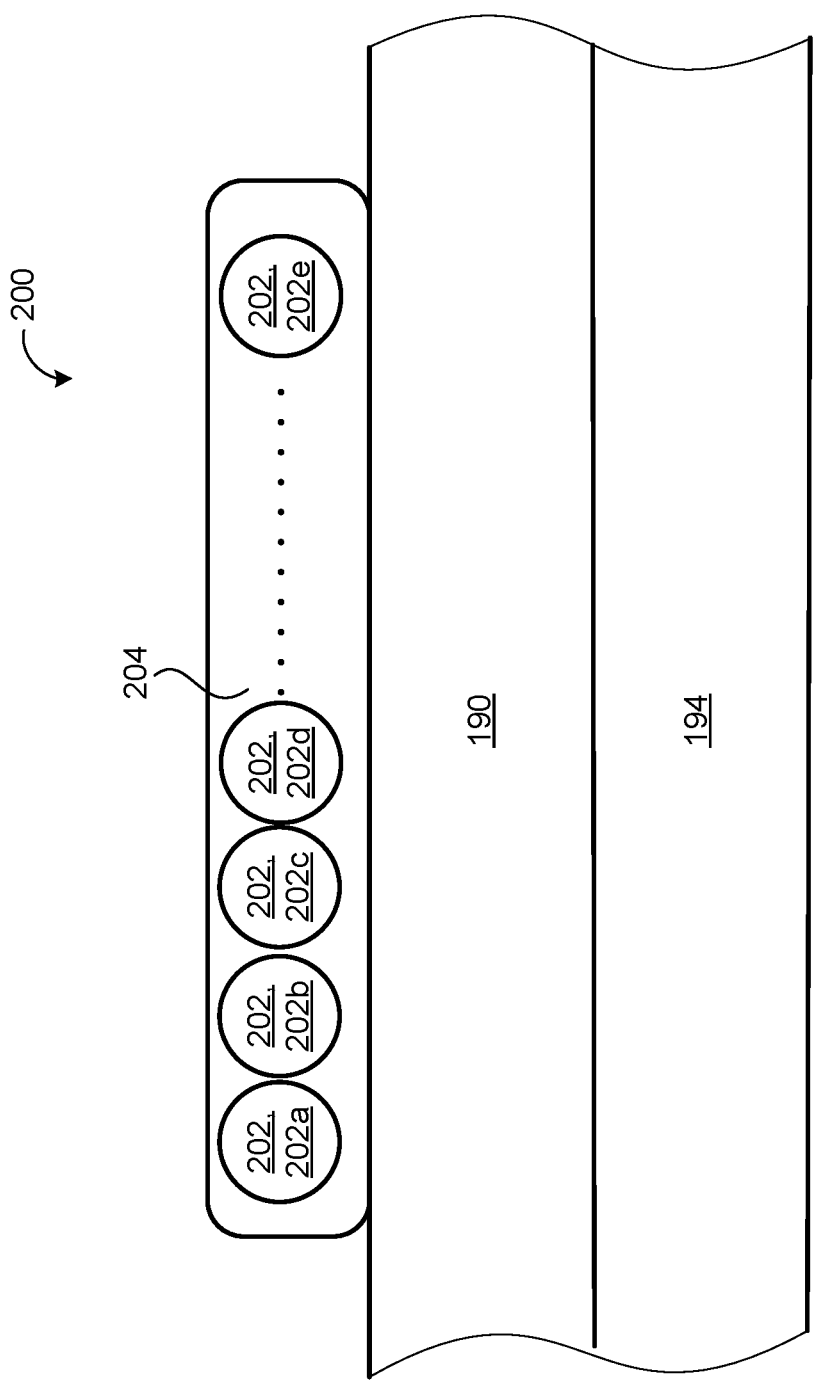
FIG. 2C is a cross-sectional view taken along line 2C-2C of FIG. 1A showing a first surface-mounted segment including a plurality of bare optical fiber glass segments deposited onto a receiving surface and an adhesive material substantially encapsulating the bare optical fiber glass segments.

FIG. 2C provides a cross-sectional view taken along line 2C-2C of FIG. 1A showing the first surface-mounted fiber segment 200a disposed onto the receiving surface 190 and the receiving surface 190 laid on the compacted base course 194. The surface-mounted fiber segment 200a includes a plurality of bare optical fiber glass segments 202, 202a-n disposed onto the receiving surface 190, and the adhesive material 204 applied to the bare optical fiber glass segments 202, 202a-n. The bare optical fiber glass segments 202 are arranged in parallel along the receiving surface 190 and the adhesive material 204 substantially encapsulates the bare optical fiber glass segments 202 and adheres the bare optical fiber glass segments 202 onto the receiving surface 190. The surface-mounted fiber segment 200a including the adhesive material 204 and the bare optical fiber glass segments 202 adhered onto the receiving surface 190 includes the collective thickness $T_1$ above the receiving surface 190. The collective thickness $T_1$ may be less than about 15 millimeters, and in some examples, the collective thickness is within the range of half (0.5) a millimeter to two (2) millimeters. In the example shown, the first surface-mounted fiber segment 200a does not include the pre-coating material 206 applied to the receiving surface 190 underneath the bare optical fiber glass segments 202.

Figure 2D:
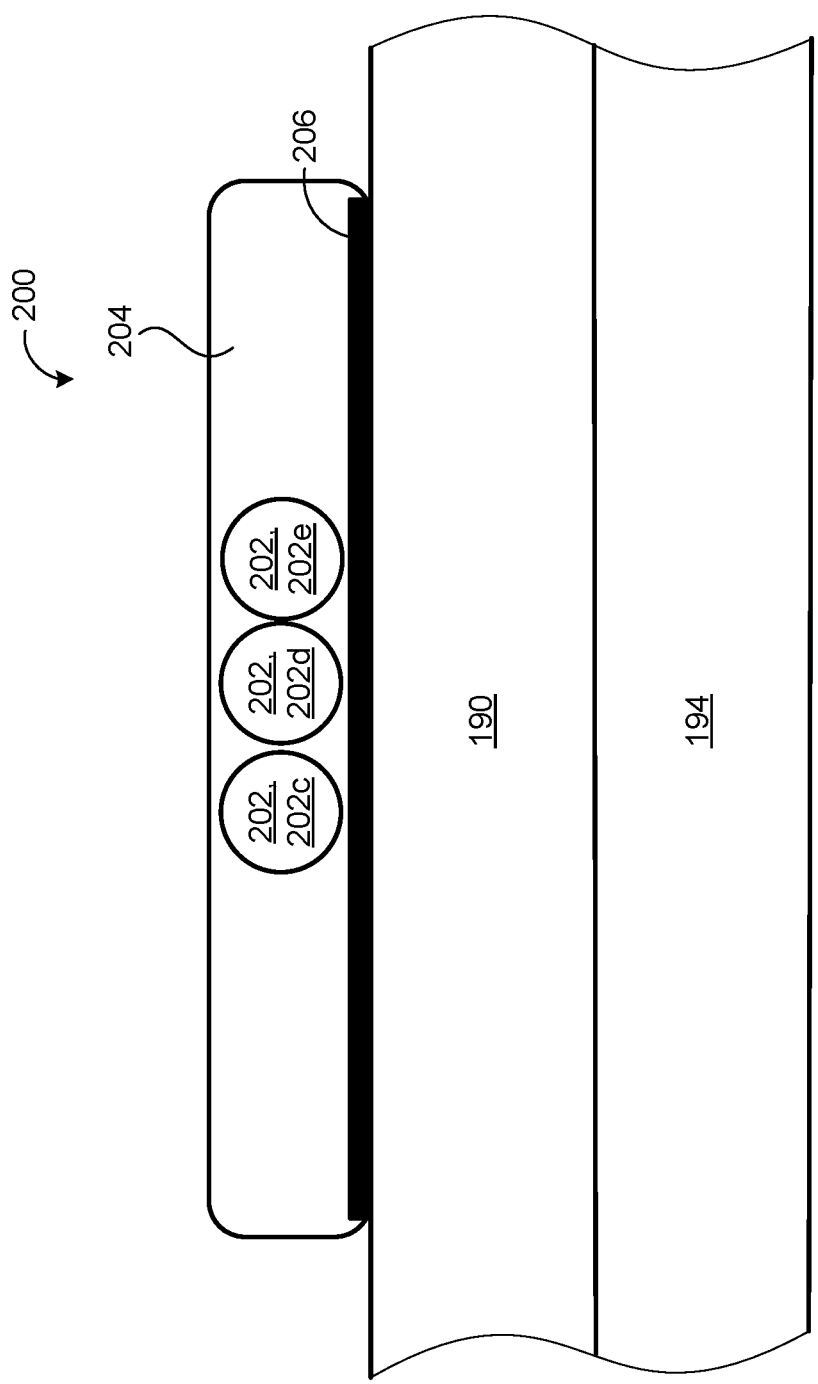
FIG. 2D is a cross-sectional view taken along line 2D-2D of FIG. 1A showing a surface-mounted segment including a plurality of bare optical fiber glass segments deposited onto a receiving surface, an adhesive material substantially encapsulating the bare optical fiber glass segments, and a pre-coating material disposed between the receiving surface and the bare optical fiber glass segments.

FIG. 2D provides a cross-sectional view taken along line 2D-2D of FIG. 1A showing the ninth surface-mounted fiber segment 200i disposed onto the receiving surface 190 and the receiving surface 190 laid on the compacted base course 194. The surface-mounted fiber segment 200i includes the bare optical fiber glass segments 202c, 202d, 202e disposed onto the receiving surface 190, and the adhesive material 204 applied to the bare optical fiber glass segments 202c, 202d, 202e. In the example shown, the ninth surface-mounted fiber segment 200i includes the pre-coating material 206 applied to the receiving surface 190 underneath the bare optical fiber glass segments 202. Here, the receiving surface 190 along the ninth surface-mounted fiber segment 200i may be rougher, or otherwise include different surface characteristics, than the section of the receiving surface 190 along the first surface-mounted fiber segment 200a. Therefore, the pre-coating material 206 may assist in adhering the bare optical fiber glass segments 202c, 202d, 202e onto the receiving surface 190.

Figure 3A:
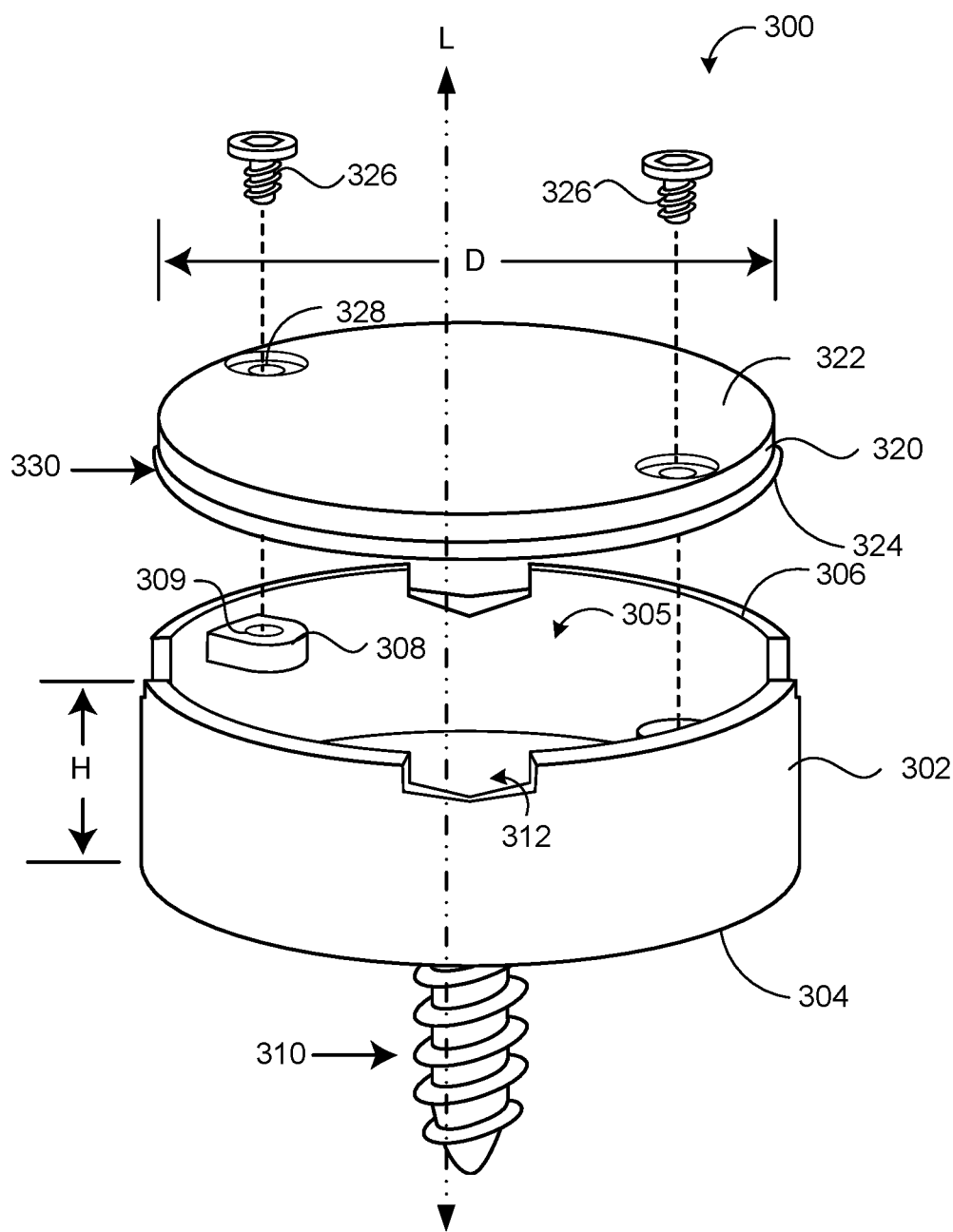
FIG. 3A is a schematic view of an example junction box.

FIG. 3A shows an example junction box 300 defining a longitudinal axis L and including a body 302 having a closed end 304 and an open end 306. The body 302 defines a junction receptacle 305 configured to receive a terminal end of at least one bare optical fiber glass segment 202. In some examples, the body 302 is substantially cylindrical and a plurality of slots 312 are formed through the body 302 adjacent to the open end 306. Each slot 312 is configured to allow the passage of at least one bare optical fiber glass segment 202 into the junction receptacle 305. A cap 320 may cover the open end 306 of the body 302 and a threaded rod 310 may extend away from the closed end 304 of the body 302 in a direction along the longitudinal axis L. In some implementations, the body 302 defines a height $H_1$ that extends along the longitudinal axis L between the closed end 304 and the open end 306. In some examples, the height $H_1$ is about two (2) inches. Other heights are possible as well.

Figure 3B:
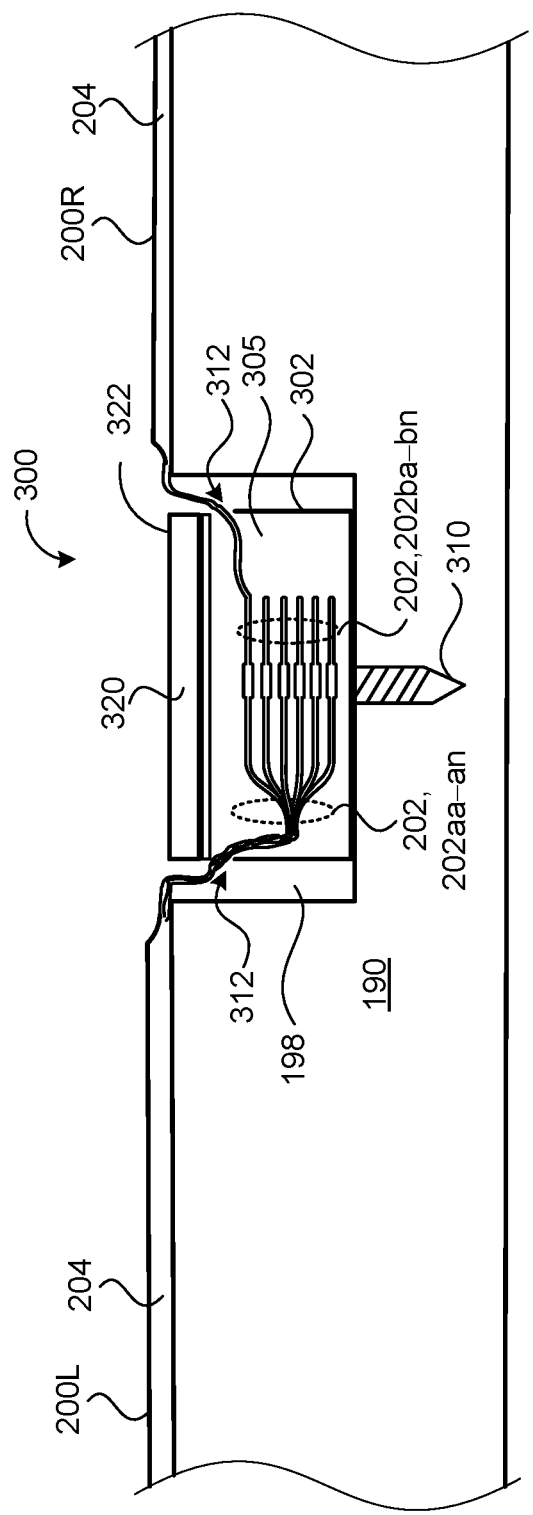
FIG. 3B is a schematic view of an example junction box deposited into a recess formed into a receiving surface.

The threaded rod 310 is configured to fixedly attach the junction box 300 to the receiving surface 190 by threadably engaging into the receiving surface 190 when the body 302 is deposited into a recess 198 (FIG. 3B). The cap 320 has a top surface 322 and a bottom surface 324 that opposes the open end 306 of the body 302. The cap 320 may releasably fasten to the body 302 via one or more fasteners 326. For instance, the fasteners 326 may extend through one or more holes 328 formed through the top and bottom surfaces 322, 324 of the cap 320 and one or more corresponding holes 309 defined by mounting features 308 of the body 302 to fasten the cap 320 to the body 302. In the example shown, the mounting features 308 extend radially inward from the body 302 and into the junction receptacle 305. In some examples, a sealing gasket 330 is disposed around a perimeter edge of the bottom surface 324 of the cap 320 to provide a fluid tight seal between the cap 320 and the open end 306 of the body 302, thereby preventing moisture and debris from entering the junction receptacle 305. Accordingly, the top surface 322 of the cap 320 and an edge defining the open end 306 of the body 302 may be substantially flush when the cap 320 fastens to the body 302. The cap 320 may be removed to provide access to the junction receptacle 305 during routine maintenance of the surface-mounted fiber network 101 or when bare optical fiber glass segments 200 need to be added, replaced, or removed from the surface-mounted fiber network 101.

FIG. 3B shows the junction box 300 deposited into the recess 198 formed into the receiving surface 190 and fixedly attached to the receiving surface 190 via the threaded rod 310. IN some examples, the threaded rod 310 threadably engages with at least a portion of the compacted base course 194. The recess 198 may be formed with machinery that drills into the receiving surface 190 and include dimensions configured to accommodate the junction box. For instance, the recess 198 may define a depth substantially equal to the height $H_1$ of the body 302. In some examples, the top surface 322 of the cap 320 is substantially flush with the open end 306 of the body 302, and the top surface 322 corresponds to a top surface 322 of the junction box 300. Moreover, in some implementations, the top surface 322 is arranged substantially flush with the receiving surface 190.

In the example shown, the junction box 300 is configured to interconnect a left surface-mounted fiber segment 200L and a right surface-mounted fiber segment 200R. The left surface-mounted fiber segment 200L includes a first group of bare optical fiber glass segments 202aa-202an adhered onto the receiving surface 190 by the adhesive material 204, and the right surface-mounted fiber segment 200R includes a second group of bare optical fiber glass segments 202ba-202bn adhered onto the receiving surface 190 by the adhesive material 204. The junction receptacle 305 of the junction box 300 receives terminal ends of the first and second groups of bare optical fiber glass segments 202aa-202an, 202ba-202bn. The bare optical fiber glass segments 202 may each feed through the slots 312 configured to allow the passage of the bare optical fiber glass segments 202 into the junction receptacle 305. Additionally, each bare optical fiber glass segment 202 of the second group of bare optical fiber glass segments 202ba-202bn is optically coupled to a corresponding bare optical fiber glass segment 202 of the first group of bare optical fiber glass segments 202aa-202an. Each slot 312 is configured to allow the passage of at least one bare optical fiber glass segment 202 into the junction receptacle 305

Figure 3C:
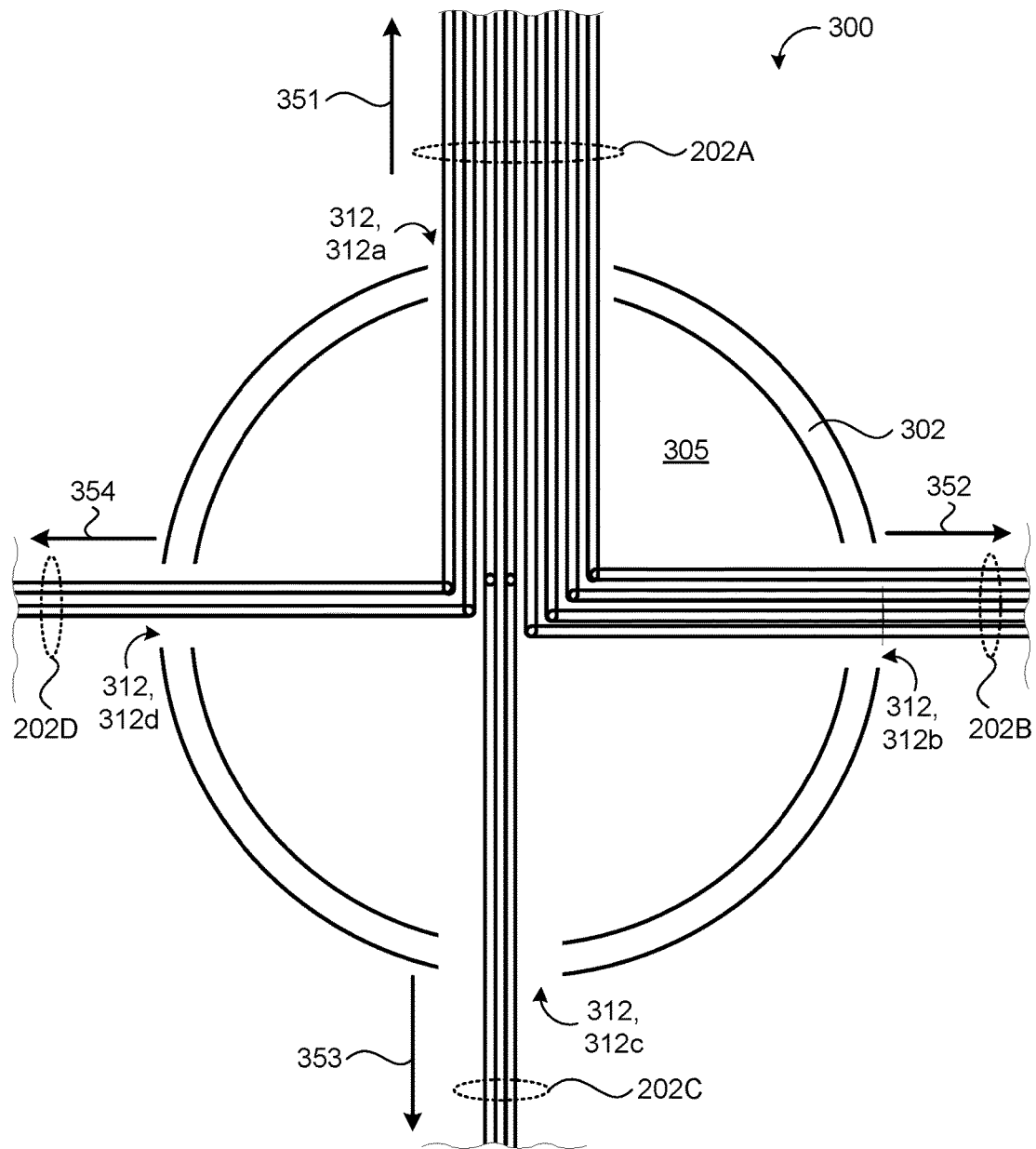
FIG. 3C is a top view of an example junction box receiving terminal ends of bare optical fiber glass segments.

FIG. 3C shows a top view of the junction box 300 with the cap 320 removed to expose the junction receptacle 305. Four groups of bare optical fiber glass segments 202A, 202B, 202C, 202D terminate in the junction receptacle 305 of the junction box 300. Each group of the bare optical fiber glass segments 202A, 202B, 202C, 202D is associated with a different corresponding surface-mounted fiber segment 200 interconnected by the junction box 300. In the example shown, the junction box 300 defines four slots 312, 312a-d formed through the body 302 of the junction box 300 and spaced apart by about 90-degrees from one another. Each bare optical fiber glass segment 202A-202D may extend out of the junction receptacle 305 through a corresponding slot 312, 312a-d and away from the junction box 300.

The first group of bare optical fiber glass segments 202A are configured to extend along the receiving surface 190 in a first direction 351 away from the junction box 300. The second group of bare optical fiber glass segments 202B are configured to extend along the receiving surface 190 in a second direction 352 away from the junction box 300. In the example shown, each bare optical fiber glass segment 202 of the second group of bare optical fiber glass segments 202B is optically coupled to a corresponding bare optical fiber glass segment 202 of the first group of bare optical fiber glass segments 202A. As the second direction 352 is angled relative to the first direction 351 (e.g., by about 90-degrees), the bare optical fiber glass segments 202A, 202B may extend along different roadways.

The third group of bare optical fiber glass segments 202C are configured to extend along the receiving surface 190 in a third direction 353 away from the junction box. As with the second group of bare optical fiber glass segments 202B, each bare optical fiber glass segment 202 of the third group of bare optical fiber glass segments 202C is optically coupled to a corresponding bare optical fiber glass segment 202 of the first group of bare optical fiber glass segments 202A. Here, the third direction 353 is substantially parallel to the first direction 351 such that the second group of bare optical fiber glass segments 202B are substantially coincident with the corresponding bare optical fiber glass segments 202 of the first group of bare optical fiber glass segments 202A optically coupled thereto.

Moreover, the fourth group of bare optical fiber glass segments 202D are configured to extend along the receiving surface 190 in a fourth direction 354 away from the junction box 300. In the example shown, each bare optical fiber glass segment 202 of the fourth group of bare optical fiber glass segments 202D is optically coupled to a corresponding bare optical fiber glass segment 202 of the first group of bare optical fiber glass segments 202A. As the fourth direction 354 is angled relative to the first direction 351 (e.g., by about 90-degrees), the bare optical fiber glass segments 202A, 202D may extend along different roadways.

In some examples, the first group of bare optical fiber glass segments 202A includes one or more sub-groups each configured to route optical signals 102, 104 to a corresponding one of the second, third, or fourth groups of bare optical fiber glass segments 202B, 202C, 202D. For instance, FIG. 3C shows the first group of bare optical fiber glass segments 202A including a total of eight (8) bare optical fiber glass segments 202 such that a first sub-group of four (4) bare optical fiber glass segments 202 each optically couple to the corresponding bare optical fiber glass segment 202 of the second group of bare optical fiber glass segments 202B. Likewise, a second sub-group of two (2) bare optical fiber glass segments 202 each optically couple to the corresponding bare optical fiber glass segment 202 of the third group of bare optical fiber glass segments 202C, and a third sub-group includes the remaining two (2) bare optical fiber glass segments 202 that each optically couple to the corresponding bare optical fiber glass segment 202 of the fourth group of bare optical fiber glass segments 202D.

Figure 4:
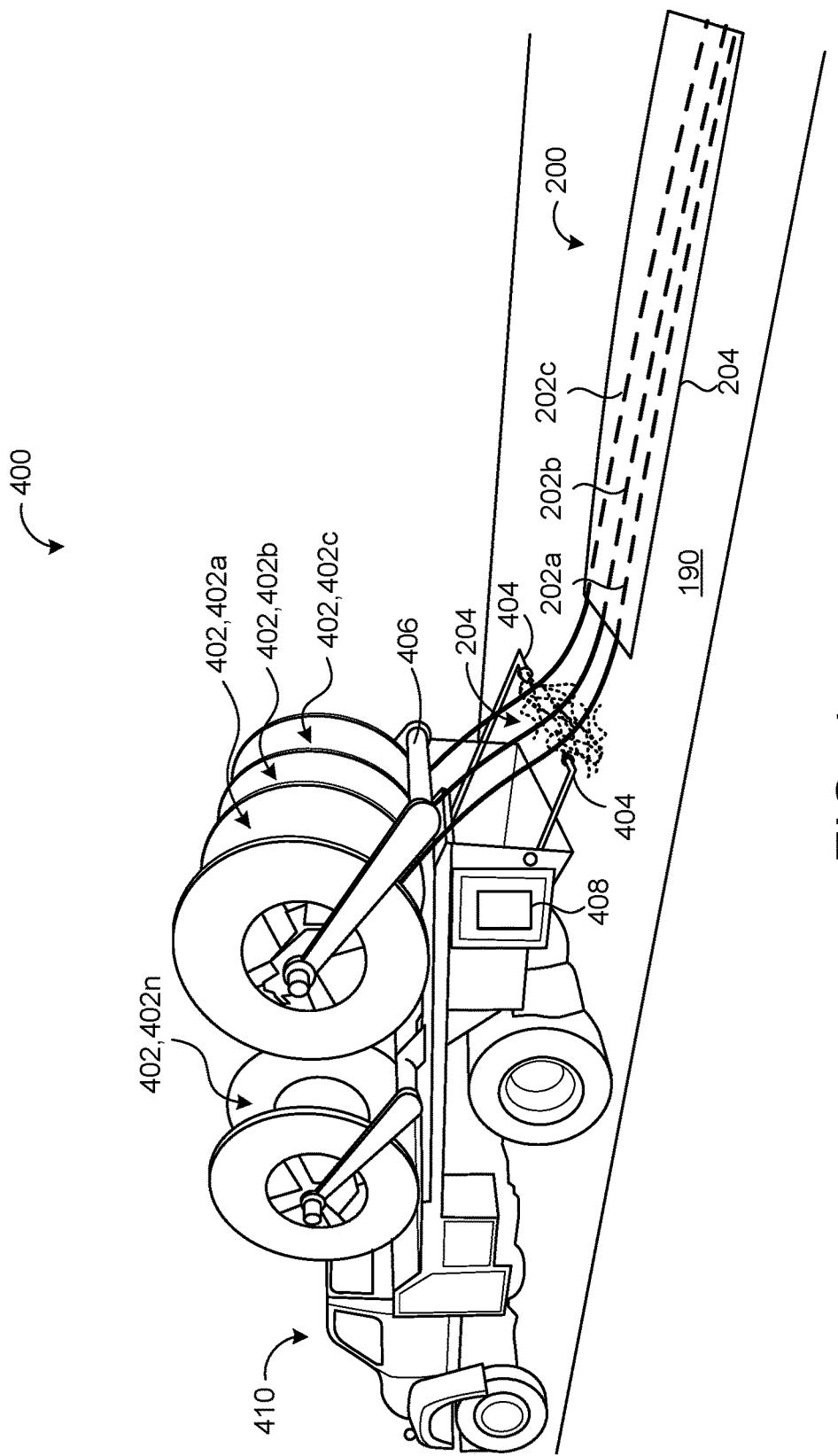
FIG. 4 is a schematic view of spools mounted on an example vehicle and configured to deploy bare optical fiber glass segments onto a receiving surface

Referring to FIG. 4, in some implementations, deploying the surface-mounted fiber segments 200 of the surface-mounted fiber network 101 includes unspooling at least one bare optical fiber glass segment 202a, 202b, 202c from at least one corresponding spool 402a, 402b, 402c and depositing the unspooled at least one bare optical fiber glass segment 202a, 202b, 202c onto a receiving surface 190. In the example shown, each fiber glass segment 202a, 202b, 202c is stored on the corresponding spool 402a, 402b, 402c mounted onto a vehicle 410. Additional spools 402n may be mounted on the vehicle 410 for storing additional fiber glass segments. In other examples, smaller spools or devices configured to store bare optical fiber glass segments 202 may be carried by a technician and manually unspooled to deposit the segment(s) 202 onto the receiving surface 190. In some implementations, the bare optical fiber glass segments 202a, 202b, 202c are not covered by a protective sheath or a protective jacket. Each bare optical fiber glass segment 202a, 202b, 202c may unspool from the corresponding spool 402a, 402b, 402c by manually pulling corresponding ends of the bare optical fiber glass segments 202, 202b, 202c. In some implementations, one or more motors are configured to rotate the spools 402a, 402b, 402c at a desirable speed for unspooling the bare optical fiber glass segments 202a, 202b, 202c. In some examples, a tensioning device 406 is mounted onto the vehicle 410 and configured to apply pressure to the unspooling bare optical fiber glass segments 202a, 202b, 202c for depositing the bare optical fiber glass segments 202a, 202b, 202c onto the receiving surface 190.

The bare optical fiber glass segments 202a, 202b, 202c are at least not covered by a protective jacket. Instead, the adhesive material 204 is applied to the bare optical fiber glass segments 202a, 202b, 202c such that adhesive material 204 substantially surround and adheres the segments onto the receiving surface 190. The adhesive material 204 may form a protective covering around the at least one bare optical fiber glass segment 202, 202b, 202c in lieu of the protective jacket. In some examples, the bare optical fiber glass segments 202a, 202b, 202c include a protective sheath to increase a thickness of a matrix used to bond multiple bare optical fiber glass segments 202 into a multi-fiber ribbon. The protective sheath may be opaque or transparent for surface-mounted fiber segments 200. In some examples, the protective sheath is transparent when the corresponding surface-mounted fiber segment 200 is associated with a single fiber drop disposed upon a driveway of a corresponding customer. In these examples, the adhesive material 204 may also be transparent. In the example shown, the adhesive material 204 is applied in liquid form by spraying the adhesive material 204 out of a pair of nozzles 404 directed toward the bare optical fiber glass segments 202a, 202b, 202c proximate to the receiving surface 190. The nozzles 404 may be in fluid communication with a tank 408 configured to store the adhesive material 204. One or more than two nozzles 404 may be used to spray and apply the adhesive material 204 to the bare optical fiber glass segments 202a, 202b, 202c. In other examples, a brush may apply the adhesive material 204 and/or the bare optical fiber glass segments 202a, 202b, 202c may pass through a bath containing the adhesive material 204 before depositing onto the receiving surface 190. The adhesive material 204 may harden to form a protective covering around the at least one bare optical fiber glass segment 202, 202b, 202c in lieu of the protective sheath or protective jacket. Moreover, the adhesive material 204 may compensate for distortions of the receiving surface 190. For instance, the receiving surface 190 may include surface cracks or chips that the adhesive material 204 may fill. Accordingly, the vehicle 410 may move along the receiving surface 190 while the at least one spool 402a, 402b, 402c unspools and the nozzles 404 apply the adhesive material 204 to substantially encapsulate and adhere the at least one bare optical fiber glass segment 202a, 202b, 202c to the receiving surface 190.

In some implementations, additional surface-mounted fiber segments 200 may be stacked over existing surface-mounted fiber segments 200 when additional fibers are needed to serve new customers. Here, at least one bare optical fiber glass segment 202 may be deposited onto the receiving surface 190 over an existing surface-mounted fiber glass segment 200. Due to the increased speed of deployment, and drastic reduction in cost compared to traditional deployment techniques such as aerially or underground, redundant surface-mounted fiber segments 200 may be deployed to offer greater service protection to the customers. Moreover, deploying redundant surface-mounted fiber segments 200 may allow technicians to perform maintenance without disrupting service to the customers.

Figure 5:
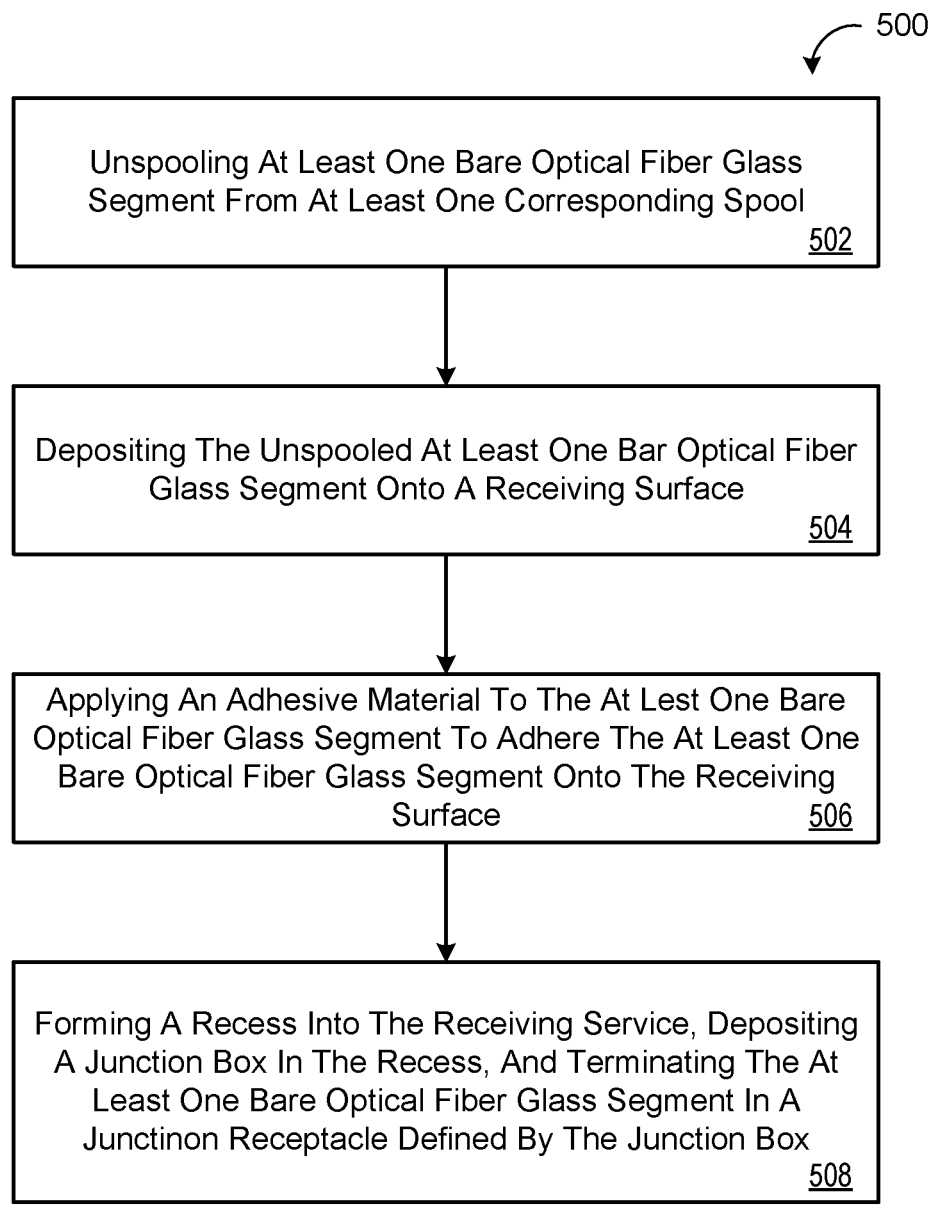
FIG. 5 is a schematic view of an example arrangement of operations for a method of deploying a surface-mounted fiber network.

FIG. 5 illustrates a method 500 for deploying a surface-mounted fiber network 101. At block 502, the method 500 includes unspooling at least one bare optical fiber glass segment 202 from at least one corresponding spool 402. In some examples, one or more spools 402, 402a-n are mounted onto a vehicle 410 and store corresponding bare optical fiber glass segments 202. In other examples, one or more technicians may carrying spools 402 and pull the bare optical fiber glass segments 202 to unspool the bare optical fiber glass segments 202 from the spool.

At block 504, the method 500 includes depositing the unspooled at least one bare optical fiber glass segment 202 onto a receiving surface 190. The receiving surface 190 may include a roadway, driveway, sidewalk, or other pathway. The receiving surface 190 may be cleared of debris and/or treated prior to depositing the at least one bare optical fiber glass segment 202. In some examples, a tensioning device 406 is mounted onto the vehicle 410 and configured to apply pressure to the unspooling at least one bare optical fiber glass segment 202 for depositing the bare optical fiber glass segment 202 onto the receiving surface 190.

At block 506, while depositing the at least one bare optical fiber glass segment 202 onto the receiving surface 190, the method 500 also includes applying an adhesive material 204 to the at least one bare optical fiber glass segment 202 such that the adhesive material 204 substantially surrounds and adheres the at least one bare optical fiber glass segment 202 onto the receiving surface 190. The adhesive material 204 and the at least one bare optical fiber glass segment 202 adhered onto the receiving surface 190 may include a collective thickness $T_1$ of less than 15 millimeters above the receiving surface 190. In some examples, the collective thickness $T_1$ is between 0.5 and about two (2) millimeters.

At block 508, the method 500 also includes forming a recess 198 into the receiving surface 190, depositing a junction box in the recess of the receiving surface 190, and terminating the at least one bare optical fiber glass segment 202 in a junction receptacle 305 defined by the junction box 300. The junction box 300 may allow the at least one bare optical fiber glass segment 202 terminated within the junction receptacle 305 to optically couple to another bare optical fiber glass segment 202 also terminated in the junction receptacle 305 of the junction box 350. In some examples, a top surface 322 of the junction box 300 is arranged substantially flush with the receiving surface 190.

The method 500 may optionally include applying a pre-coating material 206 to the receiving surface 190 before depositing the at least one bare optical fiber glass segment 202 onto the receiving surface 190. The pre-coating material 206 may provide additional protection between the bare optical fiber glass segments 202 and the receiving surface 190 and/or help facilitate in adhering the bare optical fiber glass segments 202 to the receiving surface 190 when the adhesive material 204 is applied.

The method steps may be repeated to provide a plurality of surface-mounted fiber segments 200, 200a-n disposed onto the receiving surface, and a plurality of junction boxes 300, 300a-n deposited into corresponding recesses 198 formed into the receiving surface 190 such that each junction box interconnects at least two of the surface-mounted fiber segments 200.

A number of implementations have been described. Nevertheless, it will be understood that various modifications may be made without departing from the spirit and scope of the disclosure. Accordingly, other implementations are within the scope of the following claims.

What is claimed is:

1. A surface-mounted fiber network comprising:
   a plurality of surface-mounted fiber segments disposed onto a ground surface, the ground surface exposed to an external environment and each of the bare optical fiber glass segments protruding above the ground surface; and
   a plurality of junction boxes deposited into corresponding recesses formed into the ground surface, each junction box interconnecting and optically coupling at least two of the surface-mounted fiber segments to one another, each junction box comprising a body and a cap, the body comprising an open end and a plurality of slots at the open end configured to receive a terminal end of one or more bare optical fiber glass segments proximate to the ground surface, the cap comprising a top surface flush with the ground surface and a bottom surface opposing the open end of the body,
   wherein each surface-mounted fiber segment comprises:
      the one more bare optical fiber glass segments disposed onto the ground surface; and
      an adhesive material applied to each bare optical fiber glass segment, the adhesive material substantially encapsulating each bare optical fiber glass segment and adhering each bare optical fiber glass segment onto the ground surface, the adhesive material and each bare optical fiber glass segment adhered onto the ground surface protruding above portions of the ground surface exposed to the external environment, and
   wherein a first surface-mounted fiber segment of the plurality of surface-mounted fiber segments is disposed on a curved section of the ground surface having a first radius of curvature that is less than a threshold radius of curvature, the first surface-mounted fiber segment having a first length that is based on the first radius of curvature and shorter than corresponding lengths of other ones of the surface-mounted fiber segments disposed on relatively straight sections of the ground surface, the relatively flat sections of the ground surface having corresponding radius of curvatures that are at least the threshold radius of curvature.

2. The surface-mounted fiber network of claim 1, wherein the adhesive material and each bare optical fiber glass segment adhered onto the ground surface has a collective thickness of less than about 15 millimeters above the ground surface.

3. The surface-mounted fiber network of claim 1, wherein one of the junction boxes is configured to interconnect a second surface-mounted fiber segment and a third surface-mounted fiber segment, the second surface-mounted fiber segment including a first group of bare optical fiber glass segments extending along the ground surface in a first direction away from the junction box, and the third surface-mounted fiber segment including a second group of bare optical fiber glass segments extending along the ground surface in a second direction away from the junction box, each bare optical fiber glass segment of the third group of bare optical fiber glass segments optically coupled to a corresponding bare optical fiber glass segment of the first group of bare optical fiber glass segments.

4. The surface-mounted fiber network of claim 3, wherein the first direction is substantially parallel to the second direction.

5. The surface-mounted fiber network of claim 3, wherein the first direction and the second direction are divergent.

6. The surface-mounted fiber network of claim 3, wherein the one of the junction boxes is further configured to interconnect a fourth surface-mounted fiber segment to the second surface-mounted fiber segment, the fourth surface-mounted fiber segment including a third group of optical fiber glass segments extending along the ground surface away from the junction box, each bare optical fiber glass segment of the third group of bare optical fiber glass segments optically coupled to a corresponding bare optical fiber glass segment of the first group of bare optical fiber glass segments.

7. The surface-mounted fiber network of claim 6, wherein the third group of optical fiber glass segments extend away from the junction box in a third direction substantially parallel to the first direction or the third direction.

8. The surface-mounted fiber network of claim 6, wherein the third group of optical fiber glass segments extend away from the junction box in a third direction divergent to at least one of the first direction or the third direction.

9. The surface-mounted fiber network of claim 1, wherein the adhesive material forms a protective covering around each bare optical fiber glass segment, the protective covering configured to compensate for distortions of the ground surface.

10. The surface-mounted fiber network of claim 1, wherein the at least one bare optical fiber glass segment is not covered by a protective jacket.

11. The surface-mounted fiber network of claim 1, wherein at least one of the surface-mounted fiber segments further comprises a pre-coating material applied to the ground surface, the pre-coating material disposed between each bare optical fiber glass segment and the ground surface.

12. A surface-mounted fiber network comprising:
a plurality of surface-mounted fiber segments disposed onto a ground surface, the ground surface exposed to an external environment and each of the bare optical fiber glass segments protruding above the ground surface, wherein each surface-mounted fiber segment comprises:
one or more bare optical fiber glass segments disposed onto the ground surface; and
an adhesive material applied to each bare optical fiber glass segment, the adhesive material substantially encapsulating each bare optical fiber glass segment and adhering each bare optical fiber glass segment onto the ground surface, the adhesive material and each bare optical fiber glass segment adhered onto the ground surface protruding above portions of the ground surface exposed to the external environment; and
a plurality of junction boxes deposited into corresponding recesses formed into the ground surface, each junction box interconnecting and optically coupling at least two of the surface-mounted fiber segments to one another, wherein the plurality of surface-mounted fiber segments comprises:
a first portion of the plurality of surface-mounted fiber segments disposed on and following relatively straight sections of the ground surface, each relatively straight section of the ground surface having a corresponding radius of curvature that is at least a radius of curvature threshold; and
a second portion of the plurality of surface-mounted fiber segments disposed on and following curved sections of the ground surface, each curved section of the ground surface having a corresponding radius of curvature that is less than the radius of curvature threshold, and each surface-mounted fiber segment of the second portion of the plurality of surface-mounted fiber segments having a shorter length than each surface-mounted fiber segment of the first portion of the plurality of surface-mounted fiber segments.

13. The surface-mounted fiber network of claim 12, wherein the adhesive material and each bare optical fiber glass segment adhered onto the ground surface has a collective thickness of less than about 15 millimeters above the ground surface.

14. The surface-mounted fiber network of claim 12, wherein a terminal end of each bare optical fiber glass segment is received by one of the junction boxes.

15. The surface-mounted fiber network of claim 12, wherein the one or more bare optical fiber glass segments comprises a plurality of bare optical fiber glass segments that extend substantially parallel to one another along the ground surface.

16. The surface-mounted fiber network of claim 12, further comprising a pre-coating material applied to the ground surface, the pre-coating material disposed between each bare optical fiber glass segment and the ground surface.

17. The surface-mounted fiber network of claim 12, wherein the adhesive material forms a protective covering around each bare optical fiber glass segment, the protective covering configured to compensate for distortions of the ground surface.

18. The surface-mounted fiber network of claim 12, wherein each bare optical fiber glass segment is not covered by a protective jacket.

* * * * *